Figure 1:
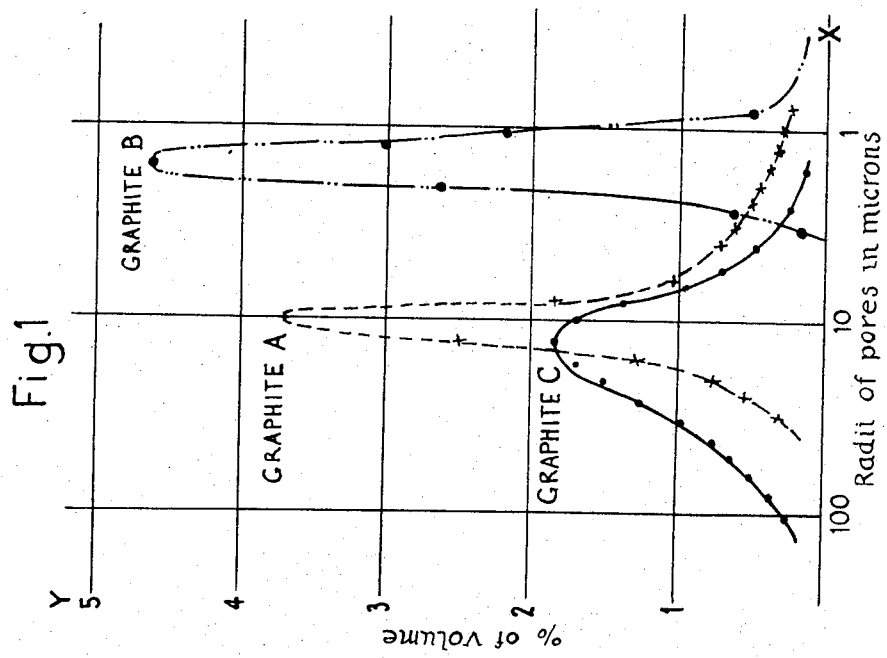

United States Patent [19]

Maire et al.

[11] 4,217,336
[45] Aug. 12, 1980

[54] ARTIFICIAL GRAPHITE

[75] Inventors: Jacques Maire, Epinay sur Seine; Jacques Fourré; Jean P. Gervais, Noisy le Sec, all of France

[73] Assignee: Le Carbone-Lorraine, Gennevilliers, France

[21] Appl. No.: 911,908

[22] Filed: Jun. 2, 1978

Related U.S. Application Data

[63] Continuation-in-part of Ser. No. 698,026, Jun. 21, 1976, abandoned.

[30] Foreign Application Priority Data

Jun. 24, 1975 [FR] France .................................. 75 19678

[51] Int. Cl.² ........................ C01B 31/04; C01B 31/02
[52] U.S. Cl. ..................................... 423/448; 423/445; 423/449
[58] Field of Search ................ 423/443, 448, 449, 450

[56] References Cited

U.S. PATENT DOCUMENTS

| 3,955,957 | 5/1976 | Newman et al. ................... 423/448 |
| 4,071,604 | 1/1978 | Schwemer ........................... 423/448 |

FOREIGN PATENT DOCUMENTS

| 2109139 | 5/1972 | France ....................................... 423/448 |
| 1130013 | 10/1968 | United Kingdom ....................... 423/448 |
| 1130829 | 10/1968 | United Kingdom ....................... 423/448 |
| 306705 | 4/1972 | U.S.S.R. .................................... 423/448 |

Primary Examiner—O. R. Veritz
Assistant Examiner—Gregory A. Heller
Attorney, Agent, or Firm—Brisebois & Kruger

[57] ABSTRACT

A dual-textured graphite has been produced having an apparent coarse strongly bonded grained structure (the macrotexture) in which each coarse grain is formed from a number of strongly linked ultrafine grains (the microtexture). The dimensions of the coarse grains are from 0.4 to 6.0 m.m. while those of the ultrafine grains are below 0.050 m.m. The fine grains are linked by graphitized pore-containing carbon having pores of less than $2\mu$ diameter. The coarse grains are also linked by graphitized pore-containing carbon having pores of from 5 to $20\mu$ diameter. Further characteristics of the graphite are a coefficient of linear expansion of $4-6\times 10^{-6}/°$ C., thermal conductivity of 0.20 cal/cm/° C./sec., electrical resistivity of $1500-2000\mu$ ohms/cm and anisotropy factor not exceeding 1.4. A process for producing such product from pitch and petroleum or coal tar coke is described.

6 Claims, 4 Drawing Figures

ARTIFICIAL GRAPHITE

This application is a continuation-in-part of our co-pending application Ser. No. 698,026 filed June 21, 1976 now abandoned.

This invention relates to the production of a novel artificial graphite and to the artificial graphite thus obtainable.

In the terminology currently used to describe carbon-containing materials, a distinction is normally drawn between structure, which is a distinguishing property of the material observed on the X-ray scale where the resolving limit is less than 1/10 micron, and texture, which is a distinguishing property of the material observed on the microscopic scale where the resolving limit is between a fraction of a micron and several millimeters.

The structure of artificial graphites depends chiefly upon the temperature of graphitisation whereas the texture of artificial graphites depends primarily upon the nature of the raw materials used and the production cycle employed.

The properties of carbon and graphite depend both upon structure and upon texture but it can be stated that the mechanical, thermal and electrical properties of artificial graphites which are graphitized at the same temperature, will depend principally upon the texture of the graphites.

The chief factor which influences the texture of an artificial graphite is the grain size of the coke which is the main constituent from which it is produced, the grains of which are bound to one another by a mass of carbonised binder.

The present invention relates to a dual-textured artificial graphite, that is to say one which is composed of coarse strongly bonded grains of graphite, the maximum size of each of said coarse grains is from 0.4 to 6 mm, which represent the macrotexture, each of which strongly bonded grains is in turn formed from a number of individual ultrafine grains the size of which is less than 0.050 mm, which represent the microtexture.

There are on the market at present two kinds of artificial graphite which are manufactured from the same starting materials, viz. petroleum coke and coal tar coke.

One is a coarse-grained (0.8 to 6 mm) graphite which is easy to make and thus cheap to manufacture and producable in large sized pieces of predetermined shape.

The other is a fine-grained (less than 0.2 mm) graphite which is much more difficult to make and is thus more expensive, but which possesses special properties which are essential for certain applications.

The higher price of the fine-grained graphite in comparison with the coarse-grained graphite is explained by the smaller tonnages which are produced, by the more numerous mixing operations which are performed during the production cycle in order to secure the desired homogeneity of the product, and by the longer heat-treatment cycles which are needed to prevent fracturing of the material during the coarse of production.

The properties which characterise fine-grained graphite are very good mechanical characteristics such as a bending strength higher than 250 kg/cm$^2$, fine and uniform sized pores, and a high coefficient of thermal expansion which lies between 3 and 8.10$^{-6}$/°C. In addition fine-grained graphite is almost completely isotropic: when shaped in a preferred direction (it has an anisotropy factor, as defined by the ratio between the coefficients of linear expansion in a transverse direction and in a linear direction respectively of less than 1.4) and completely isotropic when produced by a procedure which includes isostatic compression (its anisotropy factor is substantially 1). These properties, in particular the isotropy and the coefficient of linear expansion, are accounted for by the large number of internal bonds and by the very large degree of relative disorientation between the micro-grains.

It would therefore be an advantage to have available a material which possesses not only the very good properties of fine-grained graphite as regards isotropy and coefficient of linear expansion but which also possessed the apparent texture of coarse-grained graphite, which enables the product to be less expensive and enables articles of large dimensions to be produced.

The process of producing synthetic graphite which has been mainly adopted hitherto has been to use a binder and a filler, the purity of both of which must be controlled depending upon the intended end use of the final product. In the case of producing synthetic graphite bodies for use in nuclear reactors it has been recognized that a high standard of purity of the starting materials is desirable since this minimises the extent of the chemical purification to be carried out during graphitization. It is usual to grind the filler to desired size prior to mixing with the binder. The proportion of binder is usually kept to the minimum consistent with producing shaped bodies that can be handled and processed in a furnace. The shaped bodies are then heated in a furnace to effect gradual carbonisation of the binder and to produce a composition in which particles of binder are bonded together by carbonised material derived from the binder. Gas is evolved during this carbonisation. It is desirable that the shaped bodies used be thin. When carbonisation is complete the furnace and contents are allowed to cool. The heating procedure can be carried out under pressure.

The carbonised product obtained as just described can be converted directly to graphite by continuing the heating upon it to temperatures of the order of 2800°–3000° C. However the product may not be sufficiently dense and to increase the density the product has been allowed to cool down in the furnace, the furnace evacuated, connected to a source of molten pitch of suitable purity and the pitch allowed to enter and contact the carbonised bodies in the furnace. The pitch has then been allowed to drain away, the furnace closed and pressure applied to the contents. After several hours under pressure during which the pitch has penetrated the interstices of the carbonised bodies within the furnace, the product in the furnace has been gradually reheated to bring about carbonisation of the impregnating pitch and thus secure a carbonised body of greater density.

As an alternative to the impregnation procedure just described the carbonised product has been ground to desired particle size and formed into bodies of desired shape by compression moulding. In one process of this kind described in French Pat. No. 1295796 powdered graphite has been used as the filler whilst the binder has been an organic substance of high carbon content and the resulting mass has been heated to a temperature below 1000° C. in the absence of air to produce a body in which particles of graphite has been bound to one another by carbon produced by decomposition of the binder. After cooling the mass has been ground to pieces less than 5 mm in diameter and the pieces then compressed in a mould in the absence of any additional binder. The resulting shaped bodies can then be subjected to a heat treatment under vacuum to eliminate impurities and the heat treatment continued at an appropriate temperature to effect graphitization of the carbon formed by decomposition of the binder.

The present invention stems from the discovery that by modifying the above described procedures it is possible to produce dual-textured graphite which is different from either of the commerically available kinds of graphitized carbon and yet possesses most of the desirable properties of both of these commercial products, especially in relationship to its use in nuclear reactors.

As already indicated the starting materials employed in the manufacture of the dual-textured graphite of the invention are materials which are customarily used in the production of synthetic graphite. The starting material which is the source of the carbon grains is a finely divided petroleum coke or coal tar coke which for the present purpose should have a particle size of less than 0.050 mm. The pitch used is either petroleum pitch or coal tar pitch. An intimate mixture of 20–30% by weight of pitch and 80–70% by weight of petroleum coke or coal tar coke is first produced, shaped and shaped portions isostatically compressed at a pressure of from 500 to 1500 bars, preferably 600 to 1000 bars. The shaped portions, which are conveniently briquettes, are then slowly heated in order to bring about carbonisation of the pitch in a reducing atmosphere. Heating is at the rate of about 4° C./hour until a temperature is reached at which carbonisation of the pitch is substantially complete: this is normally a temperature of 800° to 1000° C. The shaped portions are then allowed to cool to substantially room temperature whereupon they are pulverised and the particles having a maximum diameter of from 0.4 to 6 mm, for example, separated by sieving. Coarser material is returned for further pulverisation.

The pulverised material having a maximum diameter of from 0.4 to 6 mm is then made up into an intimate mixture with a further quantity of pitch. For this second admixture 20–15% by weight of petroleum pitch or coal tar pitch and 80–85% by weight of the pulverised particles comprising carbonised material and having a maximum diameter of from 0.4 to 6 mm are taken and an intimate mixture prepared therefrom. This intimate mixture is then shaped to desired shape, e.g. to produce shaped bodies which after further treatment as outlined below will have the desired shape and dimensions for use in a nuclear reactor. The shaped bodies are isostatically compressed at a pressure of 500 to 1500 bars until no further diminution in volume occurs and then slowly heated, in a reducing atmosphere, to 850° to 1100° C. so as to bring about carbonisation of the admixed pitch. Since less pitch is present during the second heating step the rate of heating may however be faster than that employed in the first heating step: a convenient rate of heating is about 6° C./hour, which it will be observed, is about 50% greater than the rate employed in the first heating step. This rate of heating is maintained constant until substantially complete carbonisation of the pitch has occurred and the temperature is within the range of 850°–1100° C.

With regard to the isostatic compression steps it will be understood that each of these is carried out for a time sufficient to secure maximum impregnation by the pitch. By reducing the size of the product produced in the first stage to 2 mm. and below we secure a product in which the practical limit of maximum impregnation consistent with cost of production and possessing the desired combination of properties to a maximum degree is secured.

The carbonised product obtained by the above process now requires heating to a higher temperature to graphitise the same. Graphitization is brought about by the normal procedure of heating to temperatures up to 3000° C. in an inert atmosphere. The temperature is raised over a period of some hours, the rate of heating approximating 200° C./hour—and the product is subsequently allowed to cool. Whilst certain impurities are lost in the heat treatment such loss may not be sufficient for the intended end use as the product may still contain up to 1000 p.p.m. of metals and silicon. In such cases either throughout the heat treatment or during any part thereof a stream of vapour of a substance or substances which will react with the impurities present is passed through the interior of the furnace in which heat treatment to effect graphitization is taking place. Suitable materials for this purpose are chlorine, volatile halides of non-metals such as carbon tetrachloride and the sulphur halides such as sulphur hexafluoride and the various perhalo alkanes and perhalo cycloalkanes having up to 4 carbon atoms which are generally referred to as the "freons." The reaction products volatilise. In this way the residual impurities are brought down to less than 10 p.p.m. which is currently acceptable for all nuclear requirements.

The modifications thus introduced into the general procedure for the production of synthetic graphite jointly result in a product having different properties from those which could be accepted. These changes are reducing the heat treated product from the first carbonisation step to such a size that the maximum diameter of the particles is less than 2 mm, the isostatic impregnation of this finely divided product with pitch, the more rapid heat treatment during the second carbonisation and the more rapid heat treatment during graphitization which considerably reduces the overall amount of heat which has to be supplied. Whilst reduction in size after a carbonisation step has been proposed hitherto for a product already containing graphite it has not been carried to the degree required in the present procedure and the product has been moulded under pressure without further impregnation and application of isostatic pressure.

The nature of the treatment carried out appears to be reflected in the texture of the product in which there are present coarse grains each of which is formed from a large number of strongly bonded ultra-fine grains having but a few, very fine pores of less than $2\mu$ diameter in the graphitized material which separates them. In addition each of these coarse grains possesses the properties of fine-grained graphite, viz. high mechanical strength, a high coefficient of linear expansion and little or no anisotropy. Moreover when these coarse grains are examined under a polarising microscope a microstructure is discernable since the areas which show uniform reflection are less than 0.050 mm. in diameter in any direction.

It may be mentioned that the grains of coarse graphite also have a fine-grained structure, that is to say, when observed under a polarising microscope, they exhibit uniformly reflecting areas which, although very extensive, do not extend throughout the whole of the grain. This phenomenon is particularly apparent when Gilsonite coke, which has a natural microstructure, is used to make coarse grained graphite. However, this micro-structure is irregular and it is much preferred to have a fully controllable artificial micro-texture as in the case of the product of the invention.

The dual-textured graphite of the invention is found to possess many of the characteristic properties of the coarse grains of which it chiefly consists, viz.

(a) substantially complete isotropy since it has been isostatically compressed during production (a coefficient of anisotropy of 1.0), in any event the coefficient of anisotropy is less than 1.40, (b) a higher electrical resistivity than that of conventional coarse-grained graphite (1500 to 2000 $\mu\Omega$/cm compared with less than 1200 $\mu\Omega$ for coarse-grained graphite, (c) lower thermal conductivity (0.20 cal/cm/°C./sec compared with 0.30 to 0.40 for coarse grained graphite), (d) a high coefficient of linear expansion (from 4 to $6\times10^{-6}$/°C.), this value being, in the case of the dual-textured graphite of the invention, very much higher than that for coarse-grained graphite having a grain-size of between 0.8 and 6 mm, for which the coefficient of linear expansion is only 1 to $3\times10^{-6}$/°C.

The density and mechanical strength of the dual-textured graphite of the invention approximate those of coarse-grained graphite (a bending strength of 100 to 300 kg/cm$^2$), but it should be remembered that the very great strength of the coarse grains prevents fracture across the grains themselves, which is one cause of fragility in conventional coarse-grained graphite.

Thus, microphotography of the dual-textured graphite of the invention using polarised light reveals the microtexture of the coarse grains which form the macrotexture. The pore-size distribution of dual-textured graphite shows a much narrower spread of pore size than is found in conventional coarse-grained graphite and the average value for the pore size is decidedly higher (from 5 to 20$\mu$) than in the case of fine-grained graphite, for which it is between 0.5 and 2$\mu$.

As regards the manufacturing cost of the graphite according to the invention, it should be pointed out that it is lower than that of fine-grained graphite, which requires much slower heat treatments.

Moreover, it is possible, in accordance with the present invention, to obtain articles of large size: these cannot be produced from fine-grained graphite and the present invention constitutes an important improvement where articles having the properties of fine-grained graphite are required.

Furthermore, it is known that the properties which are desirable in graphite used in high-temperature nuclear reactors are those possessed by fine-grained graphite. The use of the latter is however restricted because of the way in which it is made. The graphite according to the invention possesses the particular properties which are required, whilst at the same time it can be produced in large sized shaped bodies and at a lower price. This clearly illustrates the advantages which accrue when using it in this particular field.

The following Example illustrates the preparation of a dual-textured graphite according to the invention.

EXAMPLE

The starting material employed is an intimate mixture of 75% by weight of petroleum coke having a maximum particle size of 0.050 mm. and 25% by weight of coal tar pitch. This mixture is isostatically compressed at 600 bars in the form of briquettes 500 mm. long, 200 mm. wide and 100 mm. in thickness. These briquettes are gradually heated in a furnace at the rate of 4° C./hour in a reducing atmosphere to a temperature of 1000° C. At the conclusion of the heating the product is allowed to cool to ambient temperature and the carbonised product is then pulverized and sieved. Only those grains having dimensions of less than 2 mm. are acceptable in the next step.

In the next step 85% by weight of grains having dimensions of less than 2 mm. are admixed with 15% by weight of coal tar pitch, formed into cylinders 360 mm. in diameter and 550 mm. long and compressed isostatically at 600 bars until impregnation is substantially complete. The cylinders are then heated in a reducing atmosphere at the rate of 6° C./hour up to 1100° C.

In order to graphitize the resulting carbonised product when carbonisation of the pitch has been substantially completed the temperature of the product is raised to 2800° C. at the rate of 200° C./hour. Since a product was desired which was as free as possible from metallic impurities and silicon during such heating a stream of gaseous chlorine was passed through the furnace in which heating was taking place. The major proportion of the impurities diffuse towards the surface of the cylinders where they react to form volatile chlorides of the metals and silicon tetrachloride and these are removed as they are formed.

A similar product is obtained when the petroleum coke used as starting material is replaced by coal tar coke of the same maximum particle size.

PROPERTIES COMPARED WITH THOSE OF KNOWN SYNTHETIC GRAPHITES

By way of illustration, there are given in the annexed table the properties of a dual-textured graphite (A), which are compared, on the one hand, with those of a fine-grained graphite (B) produced from the same starting materials as the dual-textured graphite and, on the other hand, with the properties of a coarse grained graphite for nuclear use (C) in the production of which isostatic compression was not used. The dual-textured graphite and the coarse-grained graphite were both produced from coal tar pitch and a baked carbon product during production but in the latter case there was no isostatic pressure.

| PHYSICAL AND ELECTRICAL CHARACTERISTICS | | | |
|---|---|---|---|
| | Dual-textured graphite of present invention (A) | Fine-grained graphite (B) | Coarse-grained graphite for nuclear use (C) |
| Density | 1.74 | 1.75 | 1.72 |
| Bending strength kg/cm$^2$ | 280 | 700 | 180 |
| Linear coefficient of expansion 10$^{-6}$/°C. | 4.7 | 5.2 | 2.5 |
| Anisotropy factor | 1.0 | 1.0 | 1.8 |
| Electrical resistivity $\mu\Omega$/cm | 2000 | 1800 | 900 |
| Thermal conductivity | | | |

-continued

| PHYSICAL AND ELECTRICAL CHARACTERISTICS | | | |
|---|---|---|---|
| | Dual-textured graphite of present invention (A) | Fine-grained graphite (B) | Coarse-grained graphite for nuclear use (C) |
| Cal/cm$^{-1}$/°C.$^{-1}$/sec$^{-1}$ | 0.2 | 0.2 | 0.3 |

Figure 2:
Figure 3:
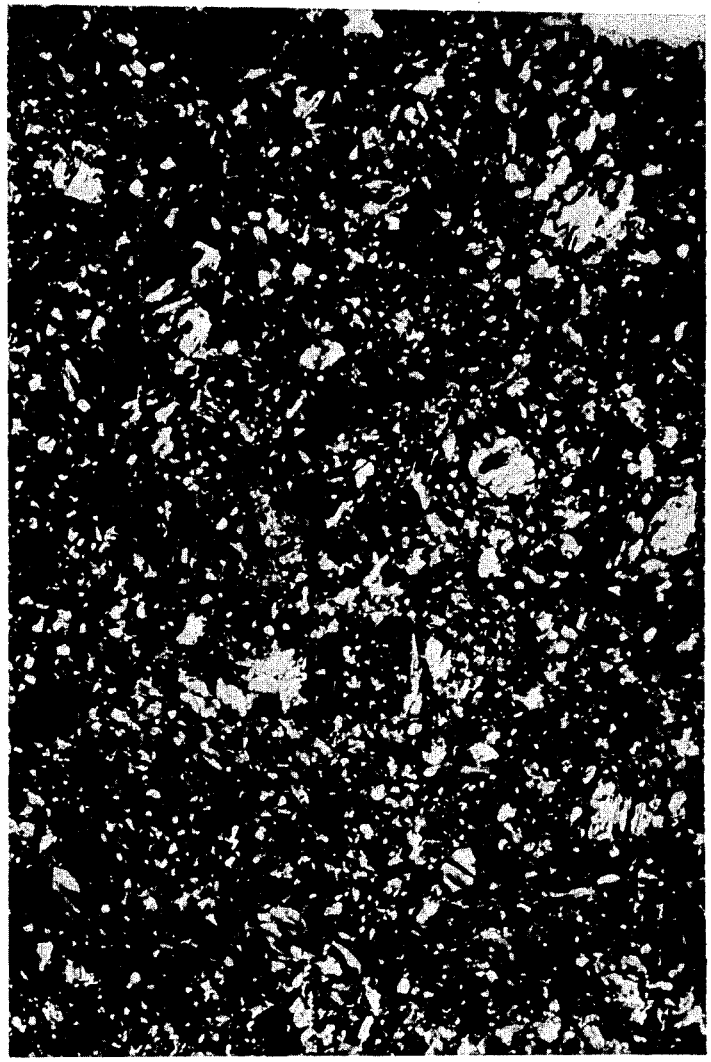
Figure 4:

The accompanying drawings also illustrate certain characteristics of the three graphites A, B and C. In the drawings:

FIG. 1 is a graph on which are plotted the radii of the pores along the x axis against percentage of pores of a given size along the y axis, FIG. 2 is a photomicrograph taken under polarised light of graphite A, FIG. 3 is a photomicrograph taken under polarised light of graphite B, and FIG. 4 is a photomicrograph taken under polarised light of graphite C.

SPREAD OF PORE-SIZE

Referring to the accompanying drawings, FIG. 1 shows pore distribution as a function of radius in the case of a dual-textured graphite (graphite A), a fine-grained graphite (graphite B) and a coarse-grained graphite for nuclear use (graphite C). Along the y axis are shown the percentages of the total volume of the graphite corresponding to pores of given size and along the x axis are shown the radii of the pores in microns.

It will be seen that Graphites A and B are similar in that both give curves having a sharp maximum. However for the dual textured graphite A this maximum coincides with a pore radius of 10 microns whereas for the fine grain graphite B this maximum occurs at a pore radius slightly greater than 2 microns. In the case of the coarse grained graphite C the pore radii of the particles is spread over a range of from about 2 microns to about 100 microns with a maximum at about 11 microns but this is not a sharp maximum.

TEXTURE AS REVEALED BY MICRO-PHOTOGRAPHY UNDER POLARISED LIGHT

In accordance with the invention, the micro-texture of the dual-textured artificial graphite (column A of the table) as revealed by polarised light under the microscope is shown in FIG. 2 of the drawings. By way of comparison that of fine-grained graphite (column B of the table) is shown in FIG. 3 and that of coarse-grained graphite for nuclear use (column C of the table) is shown in FIG. 4.

The micro-texture of graphites A and B (FIGS. 2 and 3) is the same so far as the size of the uniformly reflecting areas in the grains is concerned. The two graphites are however distinguished by the difference in the size of the pores (the black patches in the FIGS.). The coarse grains of the dual texture graphite are separated by large pores (represented by the black patches) which can be seen in graphite A (FIG. 2) whereas the black patches, and hence the pores are much smaller in graphite B (FIG. 3). The pores of the micro-structure of graphite A (FIG. 2) cannot be seen at the magnification used. The magnification is 200 in each case.

In the case of the micro-structure of graphite C (FIG. 4) the uniformly reflecting areas are much larger and are clearly distinguishable whilst the size of the pores between the grains is of the same order as that encountered with the coarse grains of the apparent texture of the dual-textured graphite A (FIG. 2). This is in agreement with the curves for graphites A and C in FIG. 1.

Thus, photomicrographic examination clearly reveals that the dual-textured graphite A, which is the subject of the invention, combines the appearance of the fine-grained graphite B with respect to the uniformity encountered within the grains with that of the coarse-grained graphite C with respect to the size of the pores between the coarse grains.

The increase in the size of the pores which occur between the coarse grains of the macrotexture of dual-textured graphite A and fine-grained graphite B explains the greater ease with which the first graphite can be heated during the carbonisation step.

We claim:

1. An artificial dual-textured graphite having a coarse grained macrostructure in which each of the coarse grains of graphite is formed from a number of strongly bonded ultrafine grains of graphite, the maximum size of each of said coarse grains being from 0.4 to 6.0 mm. and each of the dimensions of the ultrafine grains is less than 0.050 mm. said ultrafine grains being bonded together by graphitized pore-containing carbon in which the average size of the pores is less than $2\mu$ and said coarse grains are bonded together by graphitized pore-containing carbon in which the average size of the pores is from 5 to $20\mu$, said graphite being further characterised by a coefficient of linear expansion within the range of $4-6\times10^{-6}$/°C., a thermal conductivity of substantially 0.20CAL/CM/°C./sec, an electrical resistivity within the range of 1500 to 2000 $\mu\Omega$/cm and an anisotropy factor not exceeding 1.4, said graphite having been produced by a process which consists essentially of (i) preparing an intimate mixture of (a) 20-30% by weight of a pitch selected from the group consisting of petroleum pitch and coal tar pitch and (b) 80-70% by weight of a finely divided coke selected from petroleum coke and coal tar coke having a particle size of less than 0.050 mm., (ii) forming said mixture into shaped bodies, (iii) isostatically compressing said shaped bodies at a pressure within the range of 500-1500 bars, (iv) slowly heating said shaped bodies in a first heating step in a reducing atmosphere at a rate of substantially 4° C. per hour for a time sufficient to carbonise the pitch content thereof, (v) cooling the carbonised mass and subdividing the cooled carbonised product into particles having a maximum diameter of from 0.4 to 6.0 mm, (vi) preparing an intimate mixture of (c) 80-85% by weight of said subdivided carbonised product and (d) 20-15% by weight of a pitch selected from the group consisting of petroleum pitch and coal tar pitch, (vii) forming the mixture prepared in (vi) into shaped bodies, (viii) isostatically compressing shaped bodies prepared in (vii) at a pressure of 500-1500 bars, (ix) slowly heating said shaped bodies prepared in (viii) in a second heating step in a reducing atmosphere at a rate of substantially 6° C. per hour at a temperature of 850°-1100° C. for a time sufficient to carbonise the pitch content thereof, and (x) further heating the carbonised product prepared under (ix) to effect graphitisation thereof in an inert atmosphere at temperatures up to 3000° C.

2. An artificial graphite as claimed in claim 1 in which said finely divided coke is a petroleum coke.

3. An artificial graphite as claimed in claim 1 in which said finely divided coke is a coal tar coke.

4. A process for the production of a dual-textured graphite having a coarse grained macrostructure in which each of the coarse grains of graphite is formed from a number of strongly bonded ultra-fine grains of graphite, the maximum size of each of said coarse grains being from 0.4 to 6.0 mm. and each of the dimensions of the ultrafine grains is less than 0.050 mm., said ultrafine grains being bonded together by graphitised pore-containing carbon in which the average size of the pores is less than $2\mu$ and said coarse grains are bonded together by graphitised pore-containing carbon in which the average size of the pores is from 5 to $20\mu$, said graphite being further characterised by a coefficient of linear expansion within the range of 4 to $6\times10^{-6}/°C.$, a thermal conductivity of substantially 0.2 CAL/CM/°C./sec, an electrical resistivity within the range of 1500 to 2000 $\mu\Omega/cm$ and an anisotropy factor not exceeding 1.4, which process consists essentially of (i) preparing an intimate mixture of (a) 20–30% by weight of a pitch selected from the group consisting of petroleum pitch and coal tar pitch and (b) 80–70% by weight of a finely divided coke selected from petroleum coke and coal tar coke having a particle size of less than 0.050 mm, (ii) forming said mixture into shaped bodies, (iii) isostatically compressing said shaped bodies at a pressure within the range of 500–1500 bars, (iv) slowly heating said shaped bodies in a first heating step in a reducing atmosphere at a rate of substantially 4° C. per hour for a time sufficient to carbonise the pitch content thereof, (v) cooling the carbonised mass and subdividing the cooled carbonised product into particles having a maximum diameter of from 0.4 to 6.0 mm, (vi) preparing an intimate mixture of (c) 80–85% by weight of said subdivided carbonised product and (d) 20–15% by weight of a pitch selected from the group consisting of petroleum pitch and coal tar pitch (vii) forming the mixture prepared in (vi) into shaped bodies, (viii) isostatically compressing shaped bodies prepared in (vii) at a pressure of 500–1500 bars, (ix) slowly heating said shaped bodies prepared in (viii) in a second heating step in a reducing atmosphere at a rate of substantially 6° C. per hour to a temperature of 850°–1100° C. for a time sufficient to carbonise the pitch content thereof, and (x) further heating the carbonised product prepared under (ix) to effect graphitisation thereof in an inert atmosphere at temperatures up to 3000° C.

5. The process of claim 4 in which said finely divided coke is a petroleum coke.

6. The process of claim 4 in which said finely divided coke is a coal tar coke.

* * * * *